(12) United States Patent
Pyun et al.

(10) Patent No.: US 11,004,396 B2
(45) Date of Patent: May 11, 2021

(54) TIMING CONTROLLER AND DISPLAY DEVICE INCLUDING THE SAME

(71) Applicant: SAMSUNG DISPLAY CO., LTD., Yongin-si (KR)

(72) Inventors: Ki Hyun Pyun, Yongin-si (KR); Min Young Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 32 days.

(21) Appl. No.: 16/368,001

(22) Filed: Mar. 28, 2019

(65) Prior Publication Data

US 2019/0392766 A1 Dec. 26, 2019

(30) Foreign Application Priority Data

Jun. 21, 2018 (KR) .......................... 10-2018-0071501

(51) Int. Cl.
*G09G 3/3266* (2016.01)
*G09G 3/3275* (2016.01)
*G06F 12/02* (2006.01)

(52) U.S. Cl.
CPC ....... *G09G 3/3266* (2013.01); *G06F 12/0246* (2013.01); *G09G 3/3275* (2013.01); *G09G 2310/08* (2013.01); *G09G 2330/021* (2013.01); *G09G 2370/08* (2013.01)

(58) Field of Classification Search
CPC .............. G06F 12/0246; G09G 3/3266; G09G 3/3275; G09G 2370/08; G09G 5/006; G09G 2310/08
See application file for complete search history.

(56) References Cited

U.S. PATENT DOCUMENTS

| 10,007,631 | B2 | 6/2018 | Park et al. | |
|---|---|---|---|---|
| 2008/0084412 | A1* | 4/2008 | Bae ....................... | G09G 3/3611 345/212 |
| 2012/0169698 | A1* | 7/2012 | Park ..................... | G09G 3/3648 345/211 |
| 2014/0340380 | A1* | 11/2014 | Song .................... | G09G 3/3473 345/212 |
| 2015/0195700 | A1 | 7/2015 | Kim | |
| 2016/0035306 | A1* | 2/2016 | Park ..................... | G09G 3/3648 345/212 |
| 2016/0321208 | A1* | 11/2016 | Park .................... | G06F 12/0246 |

FOREIGN PATENT DOCUMENTS

KR 1020160128538 A 11/2016

* cited by examiner

*Primary Examiner* — Yuzhen Shen
(74) *Attorney, Agent, or Firm* — Cantor Colburn LLP (57) ABSTRACT

A timing controller includes: a data transmitter which transmits image data and a frame control signal to a data driver; a scan controller which transmits a scan start signal and a scan clock signal through scan control lines; and a memory interface which receives mode data from a control memory through a memory transmission line during a mode period, where the mode period is a period in which the scan controller does not transmit the scan start signal and the scan clock signal to the scan control lines.

14 Claims, 5 Drawing Sheets

TIMING CONTROLLER AND DISPLAY DEVICE INCLUDING THE SAME

This application claims priority to Korean Patent Application No. 10-2018-0071501, filed on Jun. 21, 2018, and all the benefits accruing therefrom under 35 U.S.C. § 119, the content of which in its entirety is herein incorporated by reference.

BACKGROUND

1. Field

The disclosure generally relates to a timing controller and a display device including the timing controller.

2. Related Art

With the development of information technologies, the importance of a display device, which is a connection medium between a user and information, increases. Accordingly, display devices such as a liquid crystal display device, a plasma display device, and an organic light emitting display device are more widely used.

In general, a display device includes a plurality of pixels, a data driving integrated ("DDI") circuit for driving the plurality of pixels, and a timing controller ("TCON") for controlling the DDI.

The plurality of pixels is driven according to scan signals, and a scan driver may supply the scan signals to the plurality of pixels.

The TCON may transmit scan control signals to the scan driver.

SUMMARY

Embodiments provide a timing controller which supplies signals to memory transmission lines during a period in which scan control signals are not supplied to scan control lines, and a display device including the interface system.

According to an embodiment of the disclosure, a timing controller includes: a data transmitter which transmits image data and a frame control signal to a data driver; a scan controller which transmits a scan start signal and a scan clock signal through scan control lines; and a memory interface which receives mode data from a control memory through a memory transmission line during a mode period, where the mode period is a period in which the scan controller does not transmit the scan start signal and the scan clock signal to the scan control lines.

In an embodiment, the timing controller may further include an interface control signal generator which generates an interface control signal based on the frame control signal and the scan start signal transmits the interface control signal to the memory interface during the mode period. In such an embodiment, the memory interface may operate when the interface control signal is supplied thereto.

In an embodiment, the frame control signal may be a signal supplied when a supply of the scan start signal and the scan clock signal to the scan control lines ends.

In an embodiment, the interface control signal generator may include: a NOR gate which generates a logic signal based on the frame control signal and the scan start signal; an inverter which an inverting signal by inverting the logic signal; and a switch which transmits the inverting signal as the interface control signal when a mode select signal is supplied thereto.

In an embodiment, the timing controller may further include a control resistor which transmits a control power source as the interface control signal when the mode select signal is not supplied to the switch.

In an embodiment, the timing controller may further include a data processor which generates the image data by processing external image data, based on the mode data.

In an embodiment, the timing controller may further include: a decoder which decodes a mode signal; and a command address controller which generates an address information signal, based on the decoded mode signal, and transmits the address information signal to the memory interface.

In an embodiment, the memory interface may generate a memory control signal having address information based on the address information signal and transmits the memory control signal to the control memory, and the control memory may transmit the mode data corresponding to the memory control signal to the memory interface.

In an embodiment, the mode data may represent image display setting values of a display mode.

In an embodiment, the control memory may be a flash memory.

According to another embodiment of the disclosure, a display device including: a timing controller which receives mode data from a control memory through a memory transmission line during a mode period; and a scan driver which receive a scan start signal and a scan clock signal from the timing controller through scan control lines, where the mode period is a period in which the scan driver does not receive the scan start signal and the scan clock signal through the scan control lines.

In an embodiment, the display device may further include a data driver which receive image data and a frame control signal from the timing controller.

In an embodiment, the timing controller may include: a scan controller which transmits the scan start signal and the scan clock signal to the scan driver through the scan control lines; and a memory interface which receives the mode data through the memory transmission line during the mode period.

In an embodiment, the timing controller may further include an interface control signal generator which generates an interface control signal based on the frame control signal and the scan start signal and transmits the interface control signal to the memory interface during the mode period, where the memory interface may operate when the interface control signal is supplied thereto.

In an embodiment, the frame control signal may be a signal supplied when a supply of the scan start signal and the scan clock signal to the scan control lines ends.

In an embodiment, the display device may further include a scaler which generates a mode signal and a mode select signal based on a display mode selected by a user and transmits the mode signal and the mode select signal to the timing controller.

In an embodiment, the mode data may correspond to the mode signal.

In an embodiment, the control memory may be a flash memory.

In such embodiments of the timing controller and the display device including the timing controller according to the disclosure, a signal can be supplied to the memory transmission line during the period in which scan control signals are not supplied to the scan control lines.

Further, in such embodiments of the timing controller and the display device including the timing controller according to the disclosure, a display mode can be changed in real time.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "connected" or "coupled" to another element, it can be directly connected or coupled to the another element or be indirectly connected or coupled to the another element with one or more intervening elements interposed therebetween.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for purpose of describing particular embodiments only and is not intended to be limiting. As used herein, the singular forms "a," "an," and "the" are intended to include the plural forms, including "at least one," unless the content clearly indicates otherwise. "At least A and B" means "A or B." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Hereinafter, exemplary embodiments of the invention will be described in detail with reference to the accompanying drawings.

Figure 1:
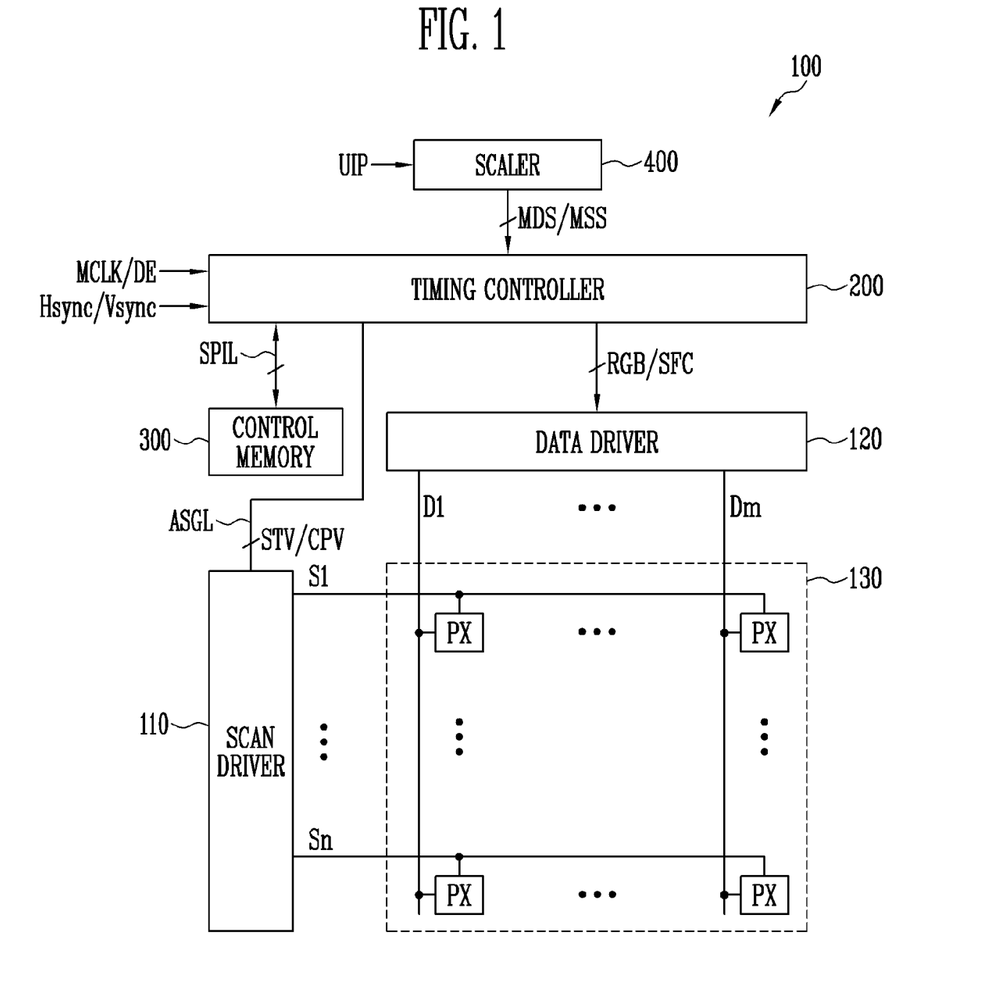
FIG. 1 is a diagram illustrating a display device according to an embodiment of the disclosure.

FIG. 1 is a diagram illustrating a display device 100 according to an embodiment of the disclosure.

Referring to FIG. 1, an embodiment of the display device 100 may include a scan driver 110, a data driver 120, a pixel unit 130, a timing controller 200, a control memory 300, and a scaler 400.

The scan driver 110 may receive scan control signals from the timing controller 200 through scan control lines ASGL.

In one embodiment, for example, the scan control signals may include a scan start signal STV and a scan clock signal CPV.

The scan driver 110 may supply scan signals to scan lines S1 to Sn (n is a natural number of 1 or more), based on the scan start signal STV and the scan clock signal CPV. In one embodiment, for example, the scan driver 110 may sequentially supply the scan signals to the scan lines S1 to Sn, respectively.

The data driver 120 may communicate with the timing controller 200, using a data interface system. In one embodiment, for example, the data driver 120 may include a receiver of the data interface system. In some embodiments, the data interface system may be implemented with a universal serial interface ("USI") module, a USI-T module, etc.

The data driver 120 may receive image data RGB, a frame control signal SFC, a clock signal or the like from the timing controller 200 through transmission lines of the data interface system.

The data driver 120 may supply data signals to data lines D1 to Dm (m is a natural number of 1 or more), based on the image data RGB, the frame control signal SFC, the clock signal or the like.

In one embodiment, for example, the data driver 120 may supply the data signals to the data lines D1 to Dm in a way such that the data signals are synchronized with a scan signal.

A receiver included in the data driver 120 may include a clock data recovery ("CDR") circuit and an equalizer, for example. This will be described in detail later.

In an embodiment, the data driver 120 may be defined by a data driving integrated circuit ("IC").

The pixel unit 130 may include pixels PX arranged on the substrate. In one embodiment, for example, the pixel unit 130 may be a display area of a display panel.

Each of the pixels PX may be coupled to (e.g., electrically connected to) a corresponding scan line among the scan lines S1 to Sn and a corresponding data line among the data lines D1 to Dm, and be supplied with a data signal and a scan signal through the corresponding data line and the corresponding scan line.

In an embodiment, the pixels PX may be arranged at intersection portions of the scan lines S1 to Sn and the data lines D1 to Dm, respectively.

The pixels PX may emit lights with luminances corresponding to the data signals applied thereto.

The pixel unit 130 may further include the scan lines S1 to Sn and the data lines D1 to Dm. In an embodiment, the scan lines S1 to Sn may extend in a first direction (e.g., a horizontal direction), and the data lines D1 to Dm may extend in a second direction (e.g., a vertical direction) different from the first direction.

In an embodiment, each of the pixels PX may be coupled to at least one of the scan lines S1 to Sn and at least one of the data lines D1 to Dm.

Each of the pixels PX may include a first transistor (e.g., a switching transistor) coupled to a corresponding scan line and a corresponding data line, a second transistor (e.g., a driving transistor) coupled to the first transistor, and a light emitting device. Hereinafter, embodiments where the light emitting device is an organic light emitting diode will be described for convenience of description. However, the disclosure is not limited thereto.

In an embodiment, a first electrode of the first transistor may be coupled to the corresponding data line of the data lines D1 to Dm, and a second electrode of the first transistor may be coupled the second transistor. In such an embodiment, a gate electrode of the first transistor may be coupled to the corresponding scan line of the scan lines S1 to Sn.

A first electrode of the second transistor may be coupled to a control power source, and a second electrode of the second transistor may be coupled to an anode electrode of the light emitting device. In such an embodiment, a gate electrode of the second transistor may be connected to the second electrode of the first transistor.

The anode electrode of the light emitting device may be coupled to the second electrode of the second transistor, and a cathode electrode of the light emitting device may be coupled to a second power source.

The light emitting device may emit light with a luminance corresponding to a driving current flowing from the control power source and the second power source therethrough.

The second transistor may control the driving current flowing from the control power source to the second power source through the light emitting device in response to a data signal transferred through the first transistor.

However, the disclosure is not limited thereto, and the structure of each of the pixels PX may be variously modified.

In an embodiment, each of the pixels PX may include a red sub-pixel that emits light of a first color (e.g., red), a green sub-pixel that emits light of a second color (e.g., green), and a blue sub-pixel that emits light of a third color (e.g., blue).

The timing controller 200 may control an overall operation of the display device 100.

In an embodiment, the timing controller 200 may receive external image data and external control signals from an outside or an external device.

In one embodiment, for example, the external control signals may include a vertical synchronization signal Vsync, a horizontal synchronization signal Hsync, a main clock signal MCLK, a data enable signal DE, and the like.

In such an embodiment, the timing controller 200 may receive a mode signal MDS and a mode select signal MSS from the scaler 400. In one embodiment, for example, the mode signal MDS may correspond to (or indicate) a display mode of the display device 100.

The timing controller 200 may process external image data, based on the mode signal MDS and the mode select signal MSS, and generate image data RGB based on the processed external image data. In one embodiment, for example, the timing controller 200 may transmit a memory control signal having address information to the control memory 300, based on the mode signal MDS and the mode select signal MSS, and thereby receive mode data from the control memory 300. The mode data may correspond to the mode signal MDS and represent image display setting values of the display mode.

The timing controller 200 may generate image data RGB by processing the external image data, based on the mode data.

The image data RGB may be suitable for operation conditions of the data driver 120 and the pixel unit 130.

The timing controller 200 may communicate with the data driver 120, using the data interface system.

The timing controller 200 may include a transmitter (e.g., a data transmitter 220 of FIG. 3) of the data interface system. In one embodiment, for example, the timing controller 200 may transmit the image data RGB, the frame control signal SFC, the clock signal, and the like to the data driver 120 through the interface lines.

The timing controller 200 may communicate with the control memory 300, using a memory interface system.

Figure 5:
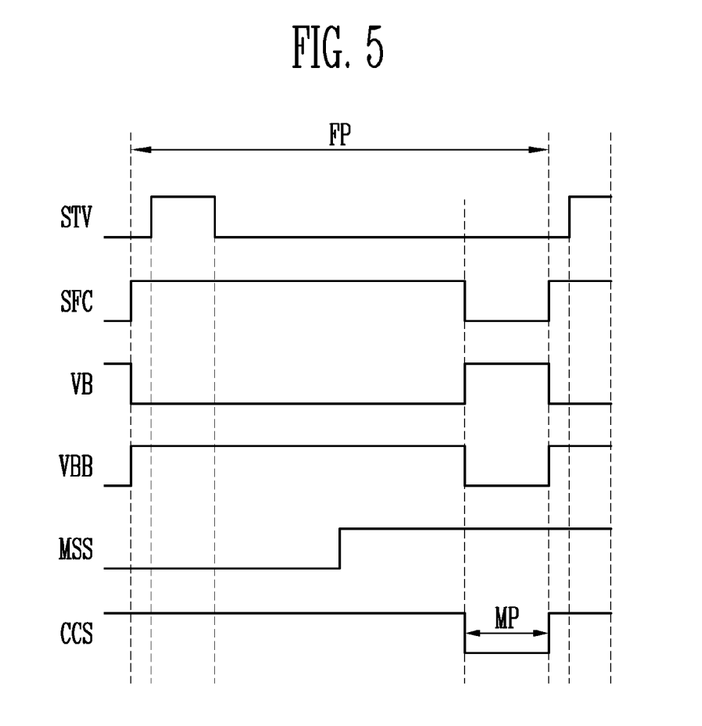
FIG. 5 is a diagram illustrating a driving method of the display device according to an embodiment of the disclosure.
Figure 6:
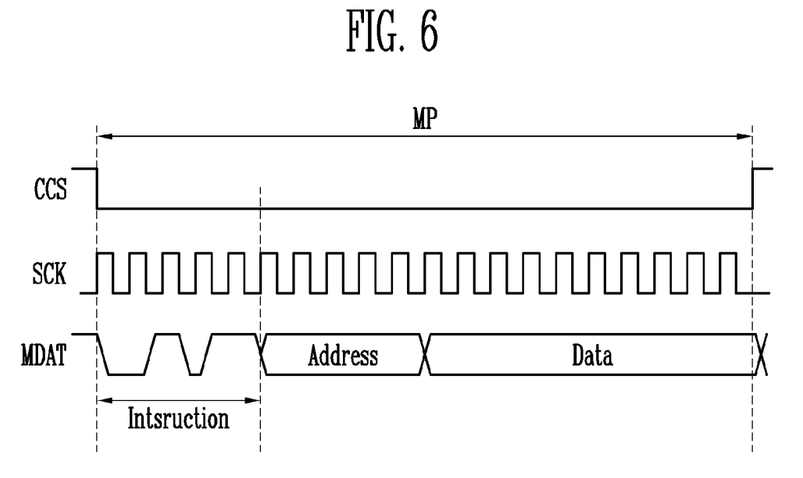
FIG. 6 is a diagram illustrating a driving method of the display device according to an embodiment of the disclosure.

In an embodiment, the timing controller 200 may receive mode data from the control memory 300 through memory transmission lines SPIL during a mode period MP (see FIGS. 5 and 6).

The mode period MP may be a period in which the scan driver 110 does not receive the scan start signal STV and the scan clock signal CPV through the scan control lines ASGL.

The timing controller 200 may transmit scan control signals to the scan driver 110 through the scan control lines ASGL.

The control memory 300 may store at least one mode data. The at least one mode data may correspond to display modes of the display device 100. In one embodiment, for example, the display modes may include a movie mode, a landscape mode, a sport mode, a standard mode, a game mode, and the like. The at least one mode data may represent image display setting values such as a luminance value and a contrast ratio with respect to each of the display modes.

In some embodiments, the control memory 300 may be implemented with a flash memory.

The control memory 300 may communicate with the timing controller 200, using the memory interface system. In some embodiments, the memory interface system may be implemented using Serial Peripheral Interface (SPI) communication.

The control memory 300 may transmit corresponding mode data to the timing controller 200 through the memory transmission lines SPIL according to the memory control signal received from the timing controller 200.

This will be described in detail with reference to FIG. 3.

The scaler 400 may receive user select information UIP from the outside. In one embodiment, for example, the user select information UIP may represent a display mode selected by a user.

The scaler 400 may transmit the mode signal MDS and the mode select signal MSS to the timing controller 200, based on the user select information UIP.

Figure 2:
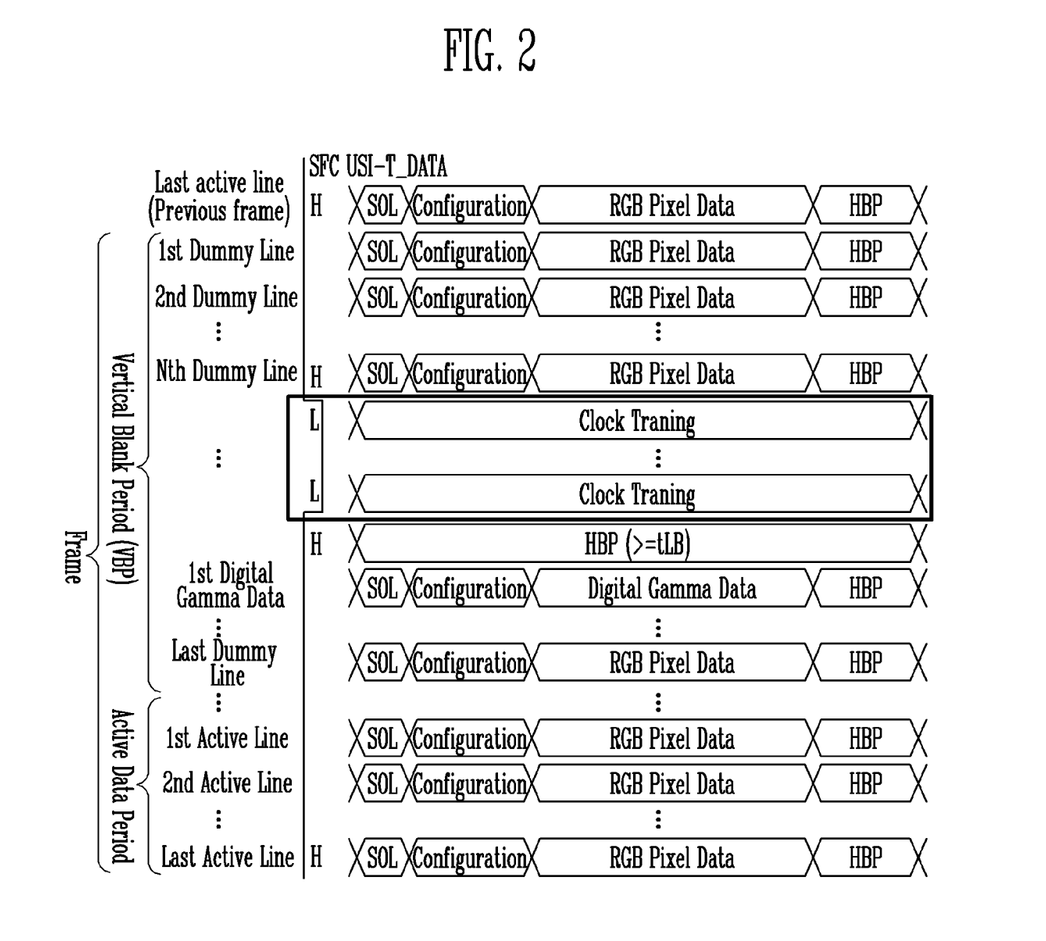
FIG. 2 is a diagram illustrating an example of a configuration of one frame.

FIG. 2 is a diagram illustrating an exemplary embodiment of a configuration of one frame.

Referring to FIGS. 1 and 2, in an embodiment of the display device 100 are driven during consecutive frames, and each frame may include an active data period and a vertical black period. The active data period and the vertical blank period may be configured in units of horizontal line periods.

In an embodiment, the timing controller 200 may transmit image data, in which a clock signal is embedded, to the data driver 120.

When the frame control signal SFC has a low level, clock signals of the transmitter and the receiver of the data interface system may be synchronized with each other. In one embodiment, for example, when the frame control signal SFC has the low level, the CDR circuit of the receiver recovers a reference clock, so that the clock signal of the receiver may be synchronized (i.e., phase-locked) with the clock signal of the transmitter.

In such an embodiment, when the frame control signal SFC has the low level, the timing controller 200 may not transmit scan control signals to the scan driver 110.

When the frame control signal SFC has a high level, each horizontal line period may be configured with a start-of-line ("SOL") period, a configuration period, an RGB pixel data period, and a horizontal blank period (referred to as HBP in FIG. 2).

Referring to FIGS. 1 and 2, when a signal is simultaneously supplied to the scan control lines ASGL and the memory transmission lines SPIL, a coupling phenomenon may occur. Therefore, signal quality may be deteriorated.

In an embodiment of the disclosure, the display device 100 supplies a signal to the memory transmission lines SPIL when any signal is not supplied to the scan control lines ASGL, such that signal quality may be improved.

A detailed operation related to this will be described below.

Figure 3:
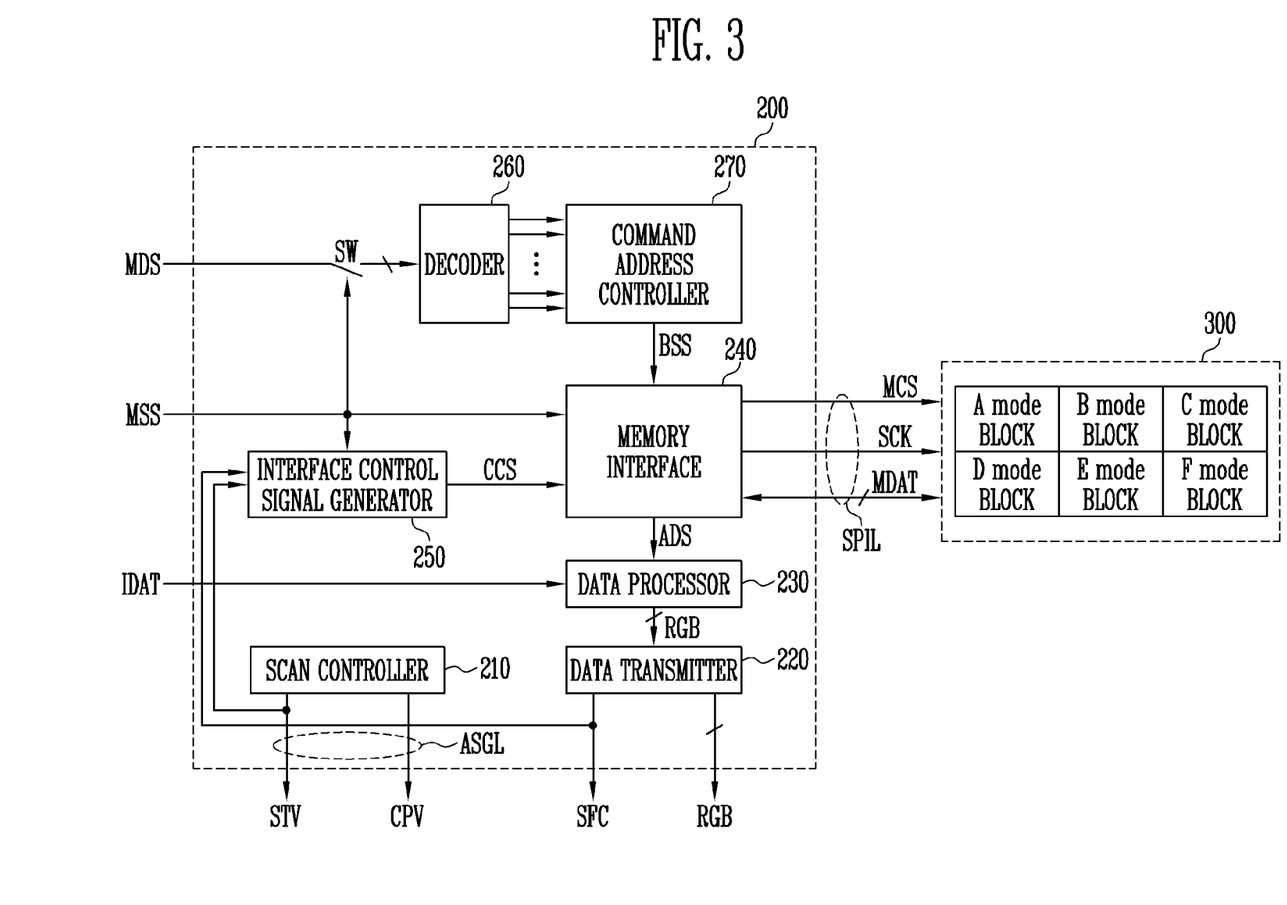
FIG. 3 is a diagram illustrating in detail a timing controller according to an embodiment of the disclosure.

FIG. 3 is a diagram illustrating in detail a timing controller 200 according to an embodiment of the disclosure.

For convenience of description, the control memory 300 is illustrated together with the timing controller 200 in FIG. 3.

Referring to FIGS. 1 to 3, in an embodiment, the timing controller 200 may include a scan controller 210, a data transmitter 220, a data processor 230, a memory interface 240, an interface control signal generator 250, a decoder 260, and a command address controller 270.

The scan controller 210 may be coupled to scan control lines ASGL.

The scan controller 210 may generate scan control signals, i.e., a scan start signal STV and at least one scan clock signal CPV, and supply the scan control signals to the scan driver 110 through the scan control lines ASGL.

In such an embodiment, the scan driver 110 may transmit the scan start signal STV to the interface control signal generator 250.

Although FIG. 2 shows an embodiment where one scan clock signal CPV is used, the disclosure is not limited thereto.

The data transmitter 220 may receive image data RGB from the data processor 230.

The data transmitter 220 may transmit a frame control signal SFC and the image data RGB to the data driver 120.

In such an embodiment, the data transmitter 220 may transmit the frame control signal SFC to the interface control signal generator 250.

In an embodiment, the data transmitter 220 may be the transmitter of the data interface system.

The data processor 230 may receive external image data IDAT from the outside.

The data processor 230 may receive a processing control signal ADS corresponding to mode data MDAT from the memory interface 240.

In an embodiment, the data processor 230 may directly receive the mode data MDAT from the memory interface 240.

The data processor 230 may generate image data RGB by processing the external image data IDAT, based on the processing control signal ADS.

In an embodiment, the data processor 230 may generate image data RGB by processing the external image data IDAT, based on the mode data MDAT.

The data processor 230 may transmit the image data RGB to the data transmitter 220.

The memory interface 240 may receive an interface control signal CCS from the interface control signal generator 250.

In such an embodiment, the memory interface 240 may receive an address information signal BSS from the command address controller 270.

The memory interface 240 may operate when the interface control signal CCS is received thereby.

In an embodiment, the memory interface 240 may receive a mode select signal MSS.

The memory interface 240 may generate a memory control signal MCS and a memory clock signal SCK, based on the address information signal BSS, and transmit the memory control signal MCS and the memory clock signal SCK to the control memory 300. In one embodiment, for example, the memory control signal MCS may have address information included in the address information signal BSS.

The control memory 300 may store data blocks corresponding to display modes, respectively. In one embodiment, for example, the data blocks may include A-mode to F-mode data blocks.

The control memory 300 may receive the memory control signal MCS.

The control memory 300 may transmit, to the memory interface 240, a data block corresponding to address information included in the memory control signal MCS as the mode data MDAT.

In an embodiment, as shown in FIG. 3, the control memory 300 and the memory interface 240 may transmit or receive the mode data MDAT, the memory control signal MCS and the memory clock signal SCK through the memory transmission lines SPIL.

The memory interface 240 may receive mode data MDAT from the control memory 300.

In one embodiment, for example, the memory interface 240 may receive mode data MDAT through the memory transmission lines SPIL during a mode period MP (see FIG. 5).

The mode period MP may be a period, in which the scan controller 210 does not transmit the scan start signal STV and the scan clock signal CPV through the scan control lines ASGL.

In an embodiment, the memory interface 240 may directly store the mode data MDAT in the control memory 300.

The memory interface 240 may generate a processing control signal ADS that represents luminance values, contrast ratio values and the like with respect to display modes, based on the mode data MDAT, and transmit the processing control signal ADS to the data processor 230.

The interface control signal generator 250 may receive the scan start signal STV and the frame control signal SFC.

The interface control signal generator 250 may generate an interface control signal CCS, based on the scan start signal STV and the frame control signal SFC.

The interface control signal generator 250 may transmit the interface control signal CCS to the memory interface 240.

In one embodiment, for example, the interface control signal generator 250 may transmit the interface control signal CCS to the memory interface 240 during the mode period MP (see FIG. 5).

The decoder 260 may receive a mode signal MDS. When the mode select signal MSS is supplied to the decoder 260, the decoder 260 may receive the mode signal MDS through a turned-on switch SW.

The decoder 260 may decode the mode signal MDS, and transmit the decoded mode signal to the command address controller 270.

The command address controller 270 may receive the decoded mode signal.

The command address controller 270 may generate an address information signal BSS, based on the decoded mode signal, and transmit the address information signal BSS to the memory interface 240.

Referring to FIGS. 1 to 3, in an embodiment of the disclosure, the display device 100 generates the interface control signal CCS to operate the memory interface 240 when the scan control signals are not supplied to the scan control lines ASGL, such that signal quality is improved.

Figure 4:
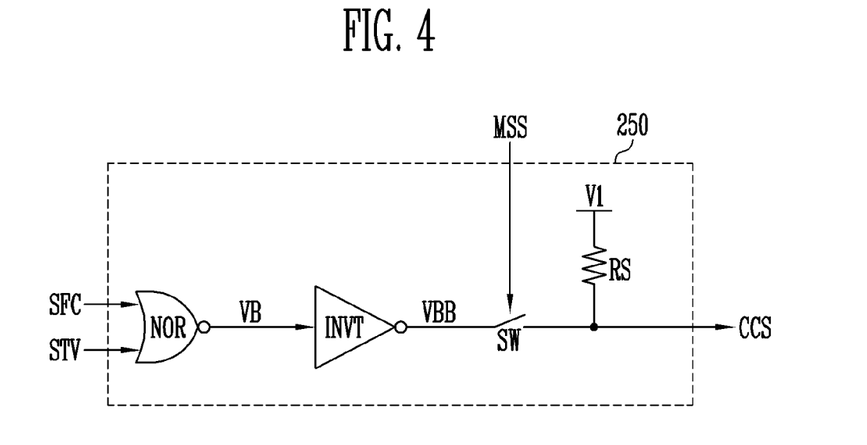
FIG. 4 is a diagram illustrating an interface control signal generator according to an embodiment of the disclosure.

FIG. 4 is a diagram illustrating an interface control signal generator 250 according to an embodiment of the disclosure.

Referring to FIG. 4, an embodiment of the interface control signal generator 250 may include a NOR gate NOR, an inverter INVT, a switch SW, and a control resistor RS coupled to a control power source V1. In one embodiment, for example, the control power source V1 may have a high-level voltage.

The NOR gate NOR may receive a frame control signal SFC and a scan start signal STV.

The NOR gate NOR may generate a logic signal VB by perform a NOR logic operation on the frame control signal SFC and the scan start signal STV, and transmit the logic signal VB to the inverter INVT.

The inverter INVT may generate an inverting signal VBB by inverting the logic signal VB.

The switch SW may be turned on when a mode select signal MSS is supplied thereto, and transmit the inverting signal VBB as an interface control signal CCS.

In such an embodiment, when the mode select signal MSS is supplied to the switch SW, the inverting signal VBB may be transmitted as the interface control signal CCS.

The control resistor RS may be a component for transmitting the voltage of the control power source V1 as the interface control signal CCS when the mode select signal MSS is not supplied.

In such an embodiment, when the mode select signal MSS is not supplied, the inverting signal VBB is not output as the interface control signal CCS, and the voltage of the control power source V1 may be output as the interface control signal CCS. Such signals will be described in greater detail with reference to FIG. 5.

FIG. 5 is a diagram illustrating a driving method of the display device according to an embodiment of the disclosure.

Referring to FIGS. 1 to 5, in an embodiment, the display device 100 is driven according to consecutive frames, and one frame corresponds to a frame period FP.

The scan start signal STV may be a signal that has a high-level voltage when the supply of a signal to the scan control lines ASGL starts.

The frame control signal SFC may be a signal that has a low-level voltage when the supply of the signal to scan control lines ASGL ends.

The logic signal VB generated as described in FIG. 4 may have a high-level voltage when both of the frame control signal SFC and the scan start signal STV have a low level.

The inverting signal VBB may have a low-level voltage when both of the frame control signal SFC and the scan start signal STV have the low level.

In an embodiment, the mode select signal MSS may have a high-level voltage. In such an embodiment, the interface control signal CCS may have a low-level voltage.

The interface control signal CCS generated as described in FIG. 4 may be supplied during a section of a frame in which both of the frame control signal SFC and the scan start signal STV have the low level.

Herein, a period of the section during which the interface control signal CCS is supplied is defined as a mode period MP.

In embodiments of the disclosure, the mode period MP may mean a period in which the scan controller 210 of the timing controller 200 does not supply scan control signals (e.g., the scan start signal STV and the scan clock signal CPV) to the scan control lines ASGL.

Thus, in such an embodiment, as the memory interface 240 communicates with the control memory 300 during the mode period MP, the display device 100 may effectively change a display mode in real time.

FIG. 6 is a diagram illustrating a driving method of the display device according to an embodiment of the disclosure.

Referring to FIGS. 1 and 6, the interface control signal CCS may be transmitted to the memory interface 240 during the mode period MP. In one embodiment, for example, the interface control signal CCS may have a low-level voltage during the mode period MP.

During the mode period MP, the memory interface 240 may transmit the memory clock signal SCK to the memory transmission lines SPIL of the control memory 300.

In such an embodiment, during the mode period MP, the memory interface 240 may read the mode data MDAT from the control memory 300.

In embodiments of the timing controller and the display device including the timing controller according to the disclosure, a signal is supplied to the memory transmission line during the period in which scan control signals are not supplied to the scan control lines.

In such embodiments of the timing controller and the display device including the timing controller, a display mode is changed during the mode period MP in which gate signals (e.g., scan signals) are not supplied. Thus, the display mode may be effectively changed in real time.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A timing controller comprising:
a data transmitter which transmits image data and a frame control signal to a data driver;
a scan controller which transmits a scan start signal and a scan clock signal through scan control lines;
a memory interface which receives mode data from a control memory through a memory transmission line during a mode period; and
an interface control signal generator which generates an interface control signal based on the frame control signal and the scan start signal and transmits the interface control signal to the memory interface during the mode period,
wherein the mode period is a period in which no signal is transmitted through the scan control lines such that the mode data is transmitted from the control memory to the memory interface while the scan controller does not transmit the scan start signal and the scan clock signal to the scan control lines, and
wherein the memory interface operates when the interface control signals is supplied thereto.

2. The timing controller of claim 1, wherein the frame control signal is a signal supplied when a supply of the scan start signal and the scan clock signal to the scan control lines ends.

3. The timing controller of claim 1, wherein the interface control signal generator includes:
a NOR gate which generates a logic signal based on the frame control signal and the scan start signal;
an inverter which generates an inverting signal by inverting the logic signal; and
a switch which transmits the inverting signal as the interface control signal when a mode select signal is supplied thereto.

4. The timing controller of claim 3, wherein the interface control signal generator further includes a control resistor which transmits a control power source as the interface control signal when the mode select signal is not supplied to the switch.

5. The timing controller of claim 3, further comprising:
a data processor which generates the image data by processing external image data, based on the mode data.

6. The timing controller of claim 3, further comprising:
a decoder which decodes a mode signal; and
a command address controller which generates an address information signal, based on a decoded mode signal, and transmits the address information signal to the memory interface.

7. The timing controller of claim 6, wherein
the memory interface generates a memory control signal having address information based on the address information signal and transmits the memory control signal to the control memory, and
the control memory transmits the mode data corresponding to the memory control signal to the memory interface.

8. The timing controller of claim 1, wherein the mode data represents image display setting values of a display mode.

9. The timing controller of claim 1, wherein the control memory is a flash memory.

10. A display device comprising:
a timing controller which receives mode data from a control memory through a memory transmission line during a mode period;
a scan driver which receives a scan start signal and a scan clock signal from the timing controller through scan control lines;
a data driver which receives image data and a frame control signal from the timing controller;
a scan controller which transmits the scan start signal and the scan clock signal to the scan driver through the scan control lines; and
a memory interface which receives the mode data through the memory transmission line during the mode period;
wherein the timing controller further includes an interface control signal generator which generates an interface control signal based on the control signal and the scan start signal and transmits the interface control signal to the memory interface during the mode period,
wherein the mode period is a period in which no signal is transmitted through the scan control lines such that the mode data is transmitted from the control memory to the timing controller while the scan driver does not receive the scan start signal and the scan clock signal through the scan control lines, and
wherein the memory interface operates when the interface control signal is supplied thereto.

11. The display device of claim 10, wherein the frame control signal is a signal supplied when a supply of the scan start signal and the scan clock signal to the scan control lines ends.

12. The display device of claim 10, further comprising:
a scaler which generates a mode signal and a mode select signal based on a display mode selected by a user and transmits the mode signal and the mode select signal to the timing controller.

13. The display device of claim 12, wherein the mode data corresponds to the mode signal.

14. The display device of claim 10, wherein the control memory is a flash memory.

* * * * *